US009857455B2

(12) United States Patent
Foreman

(10) Patent No.: US 9,857,455 B2
(45) Date of Patent: Jan. 2, 2018

(54) RADAR FILTER PROCESS USING ANTENNA PATTERNS

(71) Applicant: Terry L. Foreman, Colonial Beach, VA (US)

(72) Inventor: Terry L. Foreman, Colonial Beach, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 204 days.

(21) Appl. No.: 14/804,279

(22) Filed: Jul. 20, 2015

(65) Prior Publication Data

US 2017/0023664 A1    Jan. 26, 2017

(51) Int. Cl.
| | |
|---|---|
| *G01S 7/34* | (2006.01) |
| *G01S 7/292* | (2006.01) |
| *G01S 7/41* | (2006.01) |
| *G01S 13/95* | (2006.01) |
| *G01S 13/02* | (2006.01) |

(52) U.S. Cl.
CPC ............ *G01S 7/2925* (2013.01); *G01S 7/414* (2013.01); *G01S 13/95* (2013.01); *G01S 13/956* (2013.01); *G01S 2013/0245* (2013.01)

(58) Field of Classification Search
CPC ...... G01S 13/04; G01S 13/06; G01S 13/5242; G01S 13/5244; G01S 13/5246; G01S 13/5248; G01S 13/95; G01S 13/956; G01S 2013/9011; G01S 2013/9017; G01S 2013/9029; G01S 2013/9035; G01S 2013/9047; G01S 2013/9082; G01S 2013/0245; G01S 7/2925; G01S 7/414
See application file for complete search history.

(56) References Cited

U.S. PATENT DOCUMENTS

| | | | | |
|---|---|---|---|---|
| 4,959,653 | A | 9/1990 | Ganz | 342/17 |
| 6,633,253 | B2 * | 10/2003 | Cataldo | G01S 13/5244 342/160 |
| 6,809,681 | B1 * | 10/2004 | Niechayev | G01S 13/26 342/109 |
| 9,285,469 | B1 * | 3/2016 | Schuman | G01S 13/5248 |
| 2003/0189512 | A1 * | 10/2003 | Chen | G01S 13/5244 342/160 |
| 2011/0187584 | A1 * | 8/2011 | Pun | G01S 13/00 342/159 |

OTHER PUBLICATIONS

T. Scott Casey et al., "Sidelobe Clutter Modeling for Land-Based Radars in Mountainous Terrain", *IEEE Radar Conference* 2010.
(Continued)

*Primary Examiner* — Timothy A Brainard
*Assistant Examiner* — Daniel P Malley, Sr.
(74) *Attorney, Agent, or Firm* — Gerhard W. Thielman, Esq.

(57) ABSTRACT

A computer-implemented method is provided for filtering clutter from a radar signal received by an antenna. The method includes determining a transient clutter voltage at first and second times separated by a time interval, determining a clutter correlation for the time interval, and dividing a received signal correlation by the clutter correlation. In alternate embodiments, the clutter correlation can be combined with a noise correlation and the sum divided by the signal correlation.

3 Claims, 7 Drawing Sheets

PLAN VIEW OF ARRAY

(56) References Cited

OTHER PUBLICATIONS

R.S. Reghaven: "Statisical Interpretation of a Data Adaptive Clutter Subspace Estimation Algorithm", *IEEE TAES* 48 (2) 1370-1384, 2012.
P-L Shui et al.: "Subband ANMF Detection of Moving Targets in Sea Clutter", *IEEE TAES* 48 (4), 3578-3593, 2012.
D. J. Doviak et al. : Doppler Radar and Weather Observations 2/e, Academic Press, 1993, pp. 122-123.
G. LeFurjah et al.: "A Robust Imegrated Propagation and Site Specific Land Clutter Model", *IEEE Radar Conf.*, 2007.
C. Schleher: *MTI and Pulsed Doppler Radar*, Artech House, 2010, pp. 283-284, 295-302.

\* cited by examiner

PLAN VIEW OF ARRAY

| Table of Variables and Symbols | 1100 |
|---|---|
| $\theta$ = azimuth direction of arrival angle, FIG. 1 - 180 | |
| $\theta_p$ = azimuth pointing angle of beam at the start of coherent processing interval (CPI) | |
| $\theta_B$ = boresight angle of antenna array, FIG. 1 - 170 | |
| $\pm\Delta\theta$ = the limits of the antenna pattern | |
| $\theta_{SLB}$ = maximum angle beyond antenna pointing angle ($\theta_p$) that detections will be allowed by the radars sidelobe blanking (SLB) function. If the radar does not have a SLB function then $\theta_{SLB} = \Delta\theta$ radians | |
| $\dot\theta = \omega$ = antenna rotation rate, FIG. 1 - 160 | |
| $t$ = time | |
| $\tau$ = time offset | |
| $c_t(\theta)$ = random variable describing clutter baseband voltage received from the direction of $\theta$ at slow time $t$ | |
| $C(t)$ = random variable describing clutter baseband voltage at the output of the antenna at slow time $t$ | |
| $j = \sqrt{-1}$ | |
| $\dot\phi(\theta - \theta_B)$ = signal phase change rate as a function of direction of arrival $\theta$ and boresight $\theta_B$ | |
| $r$ = antenna phase center moment arm, FIG 1. - 150 | |
| $\lambda$ = radar carrier wavelength | |
| $v_\theta$ = instantaneous linear velocity of antenna in the direction of $\theta$ (FIG. 1 – 180) | |
| $\alpha, \beta$ = variables of integration | |
| $R_c(\tau)$ = correlation function of clutter, FIG. 3 - 330 | |
| $E\{x\}$ = expected or mean value of $x$, $E\{x\} = \int x f_x(x) dx$ where $f_x(x)$ is the probability density function of $x$ | |
| $x^*$ = complex conjugate of $x$ | |
| $g(\theta)$ = two way complex voltage antenna pattern as a function of azimuth angle $\theta$, FIG. 2 - 240 | |
| $\mathbf{R}_c$ = clutter correlation matrix | |
| $M$ = number of pulses in pulse repetition interval | |
| $T_s$ = length of pulse repetition interval in seconds | |
| $i, k$ = array indices | |
| $\mathbf{s}$ = target signal vector, contains phase change per pulse due to Doppler frequency | |
| $\omega_d$ = target Doppler angular frequency | |
| $R_s(\tau)$ = correlation function of clutter, FIG. 5 - 530 | |
| $\mathbf{M}_s$ = target correlation matrix | |
| $\mathbf{R}_n$ = noise correlation matrix | |
| $\gamma$ = clutter to noise ratio | |
| $\mathbf{I}$ = identity matrix, diagonal all ones, other elements zero | |

FIG. 11

RADAR FILTER PROCESS USING ANTENNA PATTERNS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to radar filtering. In particular, the invention relates to discrimination from clutter of received radar signals by distinguishing antenna patterns. Such clutter from low-velocity sources can obscure the target, compensation for this effect being the inventive focus.

Radar systems employ Doppler processing to discriminate targets from clutter. This process operates satisfactorily for targets having high Doppler frequency that contrast with clutter typically having zero or low Doppler frequency. However, this does not hold for Doppler frequencies close to the clutter. Detection of slow moving targets necessitate having an accurate estimate of the clutter's Doppler spectrum because the detection process endeavors to filter out the clutter power based on background Doppler spectrum. Clutter presents undesirable radar return signals and thereby constitutes noise.

Any error in the knowledge of the clutter Doppler spectrum degrades the detector's ability to distinguish targets. This degradation is negligible for fast moving targets but can be quite significant for targets whose Doppler frequency approaches the clutter Doppler spectrum. The classic approach to the problem of determining the clutter spectrum for the benefit of improved target detection is some sort of on-line clutter estimation scheme coupled with a detector.

There have been many technical papers that incorporate this approach by estimating the clutter spectrum and including this information in their detector structure, such as R. S. Raghavan, "Statistical Interpretation of a Data Adaptive Clutter Subspace Estimation Algorithm", *IEEE Transactions on Aerospace and Electronic Systems*, 48 (2), 1370-1384 (April 2012); Peng-Lang Shui, Yan-Ling Shi, "Subband ANMF Detection of Moving Targets in Sea Clutter", *IEEE Transactions on Aerospace and Electronic Systems*, 48 (4), 3578-3593 (October 2012). However, these approaches are complicated and must compensate for the non-stationarity of clutter.

This leads to the problem of obtaining sufficient training data, while taking into account real world issues of said training data being corrupted due to radio frequency interference (RFI). The exemplary approach described in the disclosure enables the radar designer to estimate the clutter spectrum accurately using knowledge of the antenna pattern alone. Using the accurate estimate of the clutter spectrum enables providing an optimum filter with the addition of an estimate of clutter-to-noise ratio (CNR), which can be accurately measured on-line or estimated with a clutter model.

Exemplary embodiments improve weather prediction using radar. Weather radars produce the three weather determinations based on analysis of clutter, as described by D. J. Doviak, et al., *Doppler Radar and Weather Observations* $2^{nd}$ edition, Academic Press (1993). These are: (1) Weather signal power of the zeroth moment of the Doppler spectrum. (2) Mean Doppler velocity of the first moment of the power-normalized spectra. (3) Spectrum width, the square root of the second moment about the first of the normalized spectrum. This is a measure of the velocity dispersion within the resolution volume.

Clutter can seriously degrade the accuracy of the weather moments produced by weather radars. The largest amplitude clutter that weather radars must contend with is ground clutter. The classic approach to the problem of clutter in weather radar involves filtering out the clutter using Doppler processing. These schemes rely on assumptions of the clutter correlation matrix or Doppler spectrum. (Correlation and spectrum are both related by the Fourier transform. Thus, knowing one enables computing the other.)

SUMMARY

Conventional Doppler radar filtering techniques yield disadvantages addressed by various exemplary embodiments of the present invention. In particular, a computer-implemented method is provided for filtering clutter from a radar signal received by an antenna by providing clutter temporal correlation properties solely from the antenna combined with clutter modeling to determine clutter-to-noise ratio, and forming a clutter filter to optimally remove clutter while preserving the desired signal.

The method includes determining a transient clutter voltage at first and second times separated by a time interval, determining a clutter correlation for the time interval, and dividing a received signal correlation by the clutter correlation. In alternate embodiments, the clutter correlation can be combined with a noise correlation and the sum divided by the signal correlation. In other embodiments, a computer-implemented device is provided to execute the exemplary operations.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 11 is a tabular view of parameters relating to the antenna correlation.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), digital signal processor (DSP), a field programmable gate array (FPGA) or other related component.

Because exact knowledge of the clutter spectrum is not known, simple assumptions are made in designing the filters to remove the clutter that reduces performance. The exemplary approach described herein enables a radar designer to accurately estimate the clutter spectrum using characteristics of the antenna pattern alone. Based on this information, an optimum clutter filter can be designed. In addition other more sophisticated techniques of clutter elimination can further improve performance by using an exemplary clutter correlation spectrum determined herein. The direct advantages of exemplary embodiments are enabling the weather radar designer to maximize clutter reduction minimize distortion of a weather signal.

Figure 1:
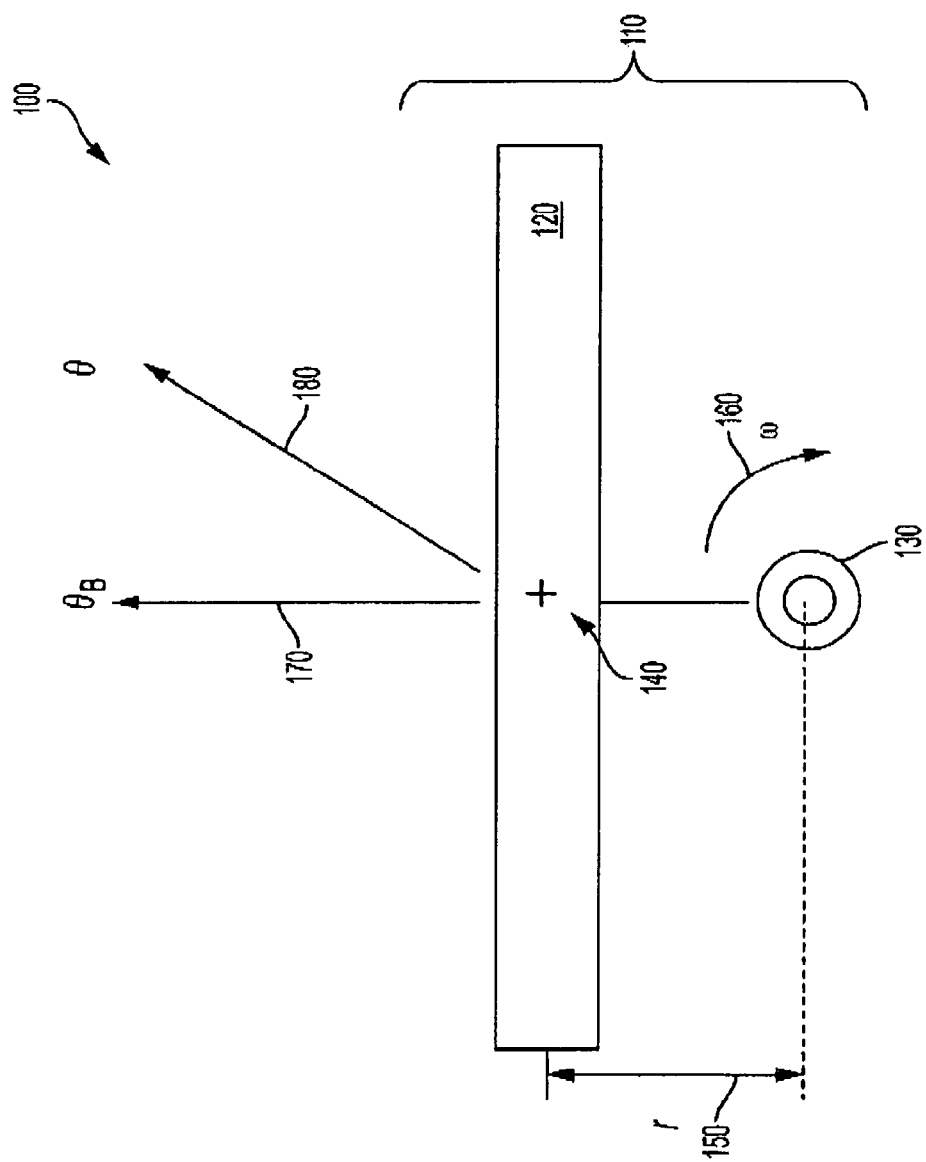
FIG. 1 is a plan view of an exemplary phased radar antenna array.

FIG. 1 shows a plan view 100 of an exemplary phased radar array 110. An antenna panel 120 connects to a rotation axis 130. The panel 120 has a phase center 140 and the rotation axis 130 is separated from that phase center 140 by radial distance r 150. The axis 130 turns at angular speed ω 160. From the phase center 140, the panel 120 projects an antenna array normal vector 170 and beam pointing vector 180 for radiation direction, respectively from normal angle $\theta_B$ and azimuth angle θ. Because the phase center 140 and the rotation axis 130 do not coincide, and the direction of radiation and the antenna normal angle 170 also do not coincide, there will be an instantaneous linear velocity of the antenna in the direction of the beam pointing angle 180.

Figure 2:
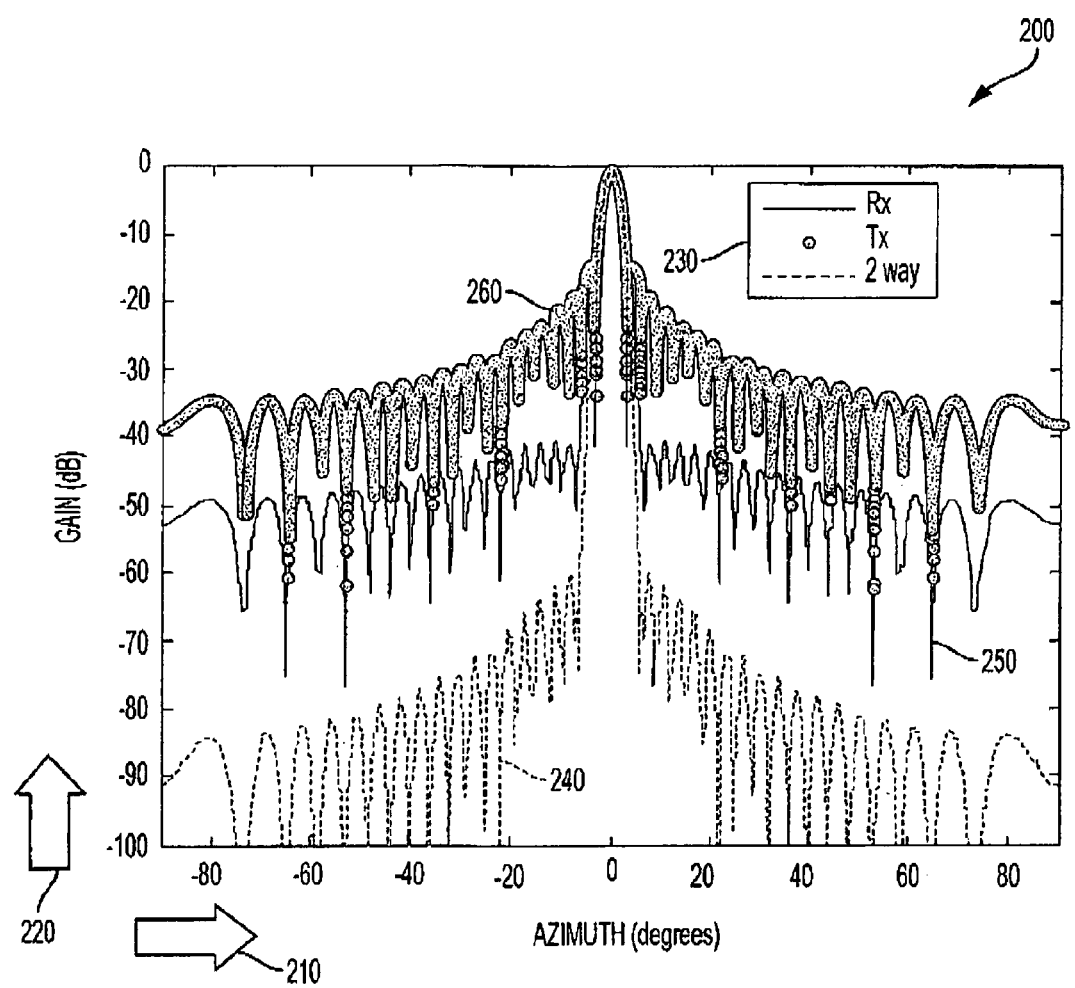
FIG. 2 is a graphical view of an antenna pattern gain plot.

FIG. 2 shows a graphical view of an antenna patter gain plot 200. The abscissa denotes azimuth angle 210 in degrees, and the ordinate denotes gain 220 in decibels. A legend 230 identifies two-way gain 240, receive gain 250 and transmit gain 260 in increasing order, and peaks at normal (i.e., zero azimuth). The two-way antenna gain 240 modulates the clutter and target amplitudes as the antenna panel 120 rotates.

Figure 3:
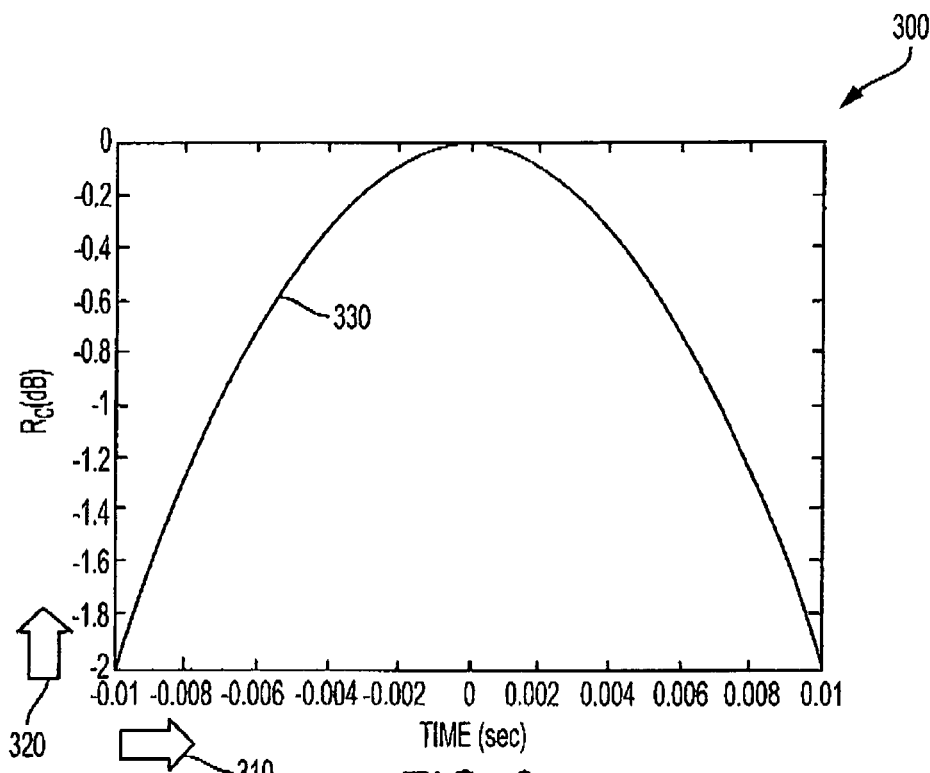
FIG. 3 is a graphical view of a clutter time correlation plot.

FIG. 3 shows a graphical view of a time correlation plot 300 for clutter response at 10 milliseconds (ms) coherent processing interval (CPI), with the number of pulses at one-hundred. Conditions for the plot 300 include antenna rotation rate of 30 revolutions-per-minute (rpm) about the axis 130, and offset distance 150 of 1 meter (m) for the phase center 140. The abscissa denotes time offset τ 310 in seconds (s), and the ordinate denotes clutter correlation function $R_c$ 320 in decibels (dB). The inverse parabolic response curve 330 extends in time domain from −0.01 s to +0.01 s and in power range from −2 dB to 0 dB.

Figure 4:
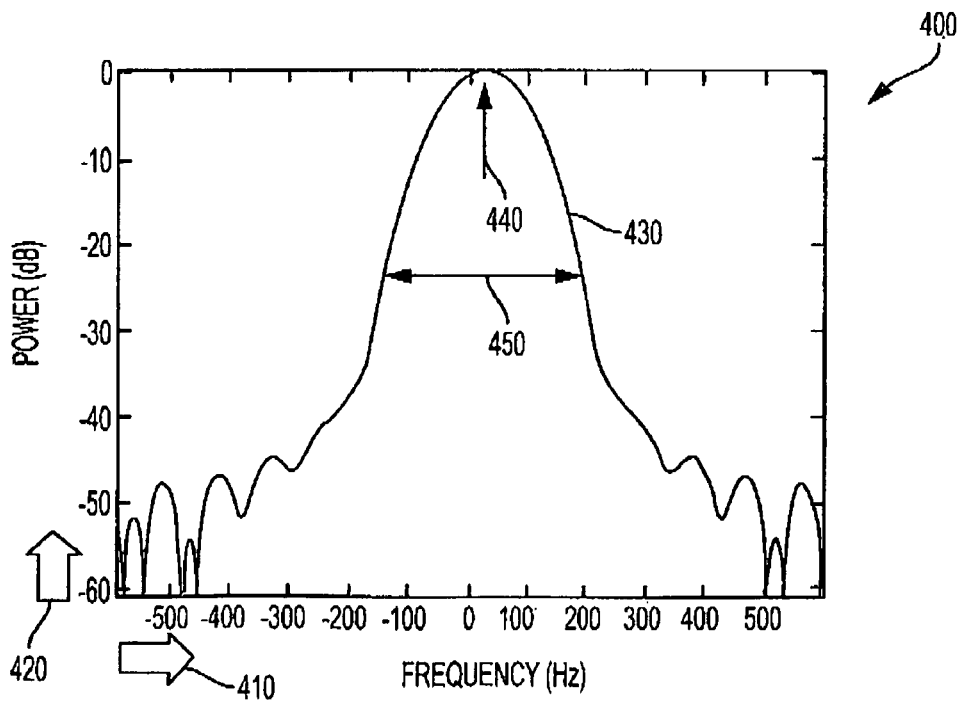
FIG. 4 is a graphical view of a Doppler frequency clutter spectrum plot.

FIG. 4 shows graphical view of a Doppler frequency clutter spectrum plot 400 for CPI with antenna rotation. The Doppler spectrum is obtained by performing a Fourier transform of the clutter response time correlation function in graph 300. The abscissa and ordinate respectively denote frequency 410 in Hertz and power 420 in decibels. The response curve 430 shows minimum side-lobe powers of about −44 dB beyond ±400 Hz, which is determined by the window function. The peak response of the clutter spectrum 440 is offset from zero due to the rotation of the antenna panel 120 as illustrated in view 100. The spectral spread of the clutter spectrum 450 is due to the modulation of the antenna two-way gain 240 and the finite length of the CPI being 10 ms.

Figure 5:
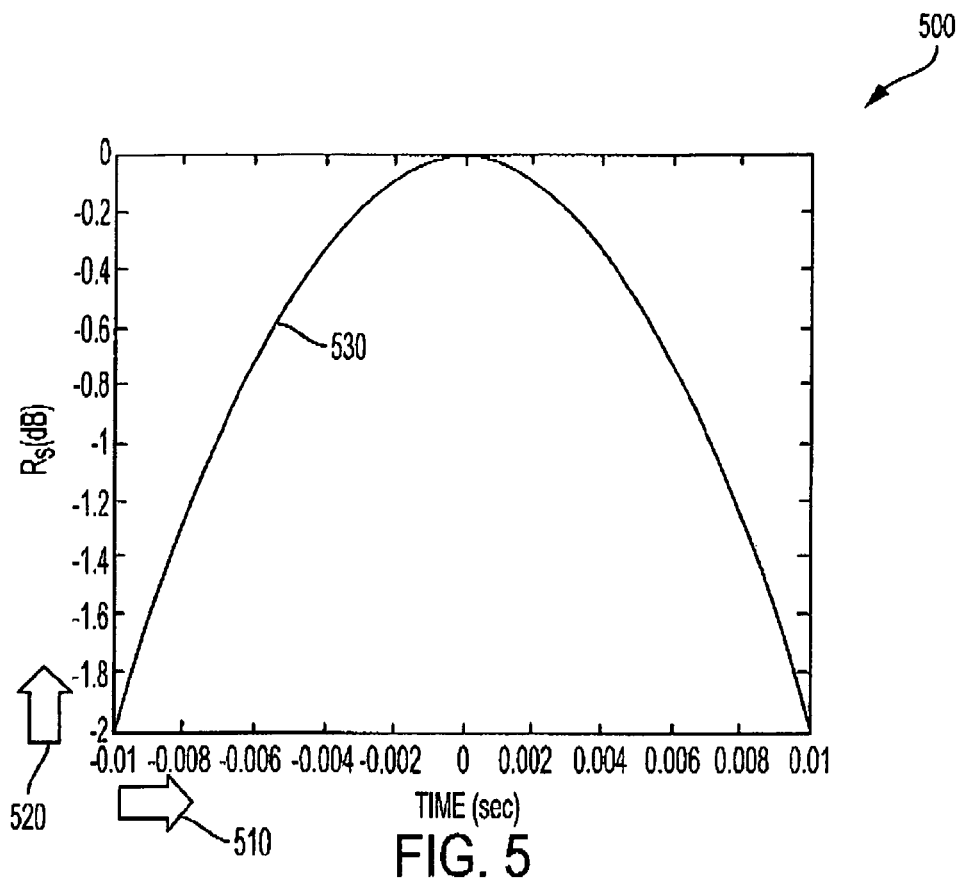
FIG. 5 is a graphical view of a time correlation target response plot.

FIG. 5 shows graphical view of a time correlation target response plot 500 for target spectrum response at 10 ms CPI, number of pulses at one-hundred, and with antenna rotation previously described. The abscissa denotes time offset 510 τ in seconds, and the ordinate denotes correlation function $R_s$ 520 of the target correlation in decibels. The inverse parabolic response curve 530 extends in time domain from −0.01 s to +0.01 s and in response range from −2 dB to 0 dB and is a function of the antenna two-way gain 240.

Figure 6:
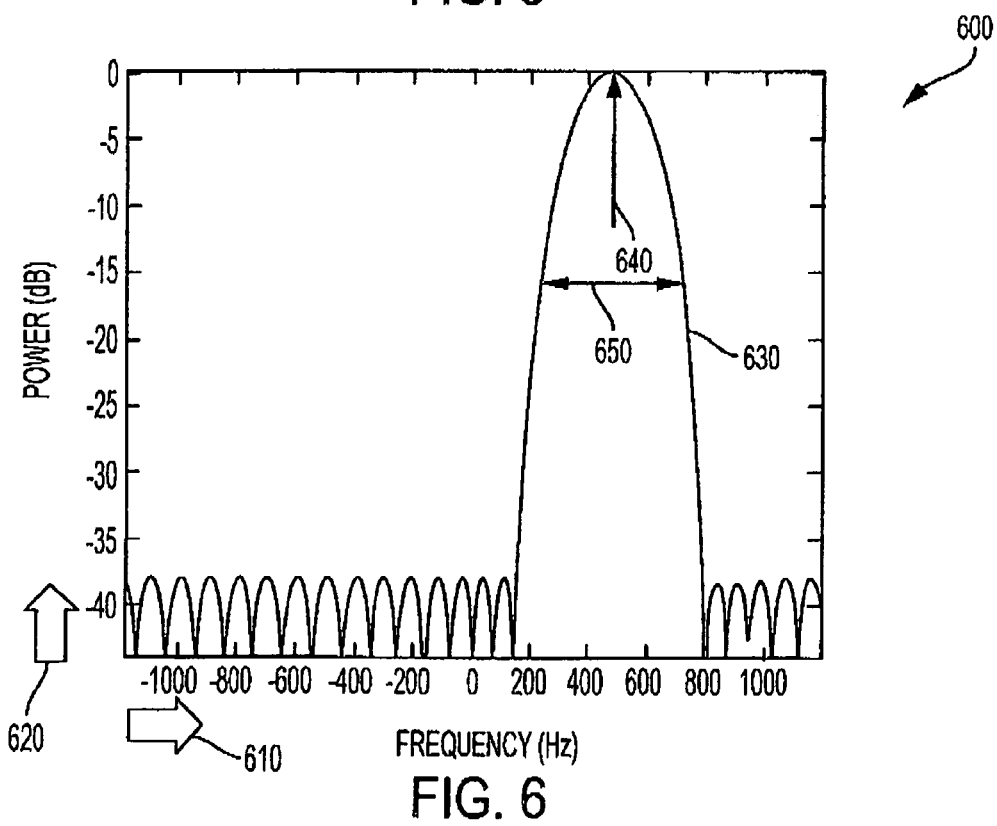
FIG. 6 is a graphical view of a Doppler frequency target spectrum plot.

FIG. 6 shows graphical view of a Doppler frequency target spectrum plot 600 for CPI with antenna rotation. The Doppler spectrum is obtained by a Fourier transform of the target response time correlation function in plot 500. The abscissa denotes frequency 610 in Hertz, and the ordinate denotes power 620 in decibels. The response curve 630 shows maximum response 640 determined by the target range rate and the antenna motion. Spectral width 650 is determined by the antenna pattern of the two-way gain 240 and the finite CPI length of 10 ms. The main lobe for the spectral width 650 extends symmetrically from +460 Hz±320 Hz.

Figure 7:
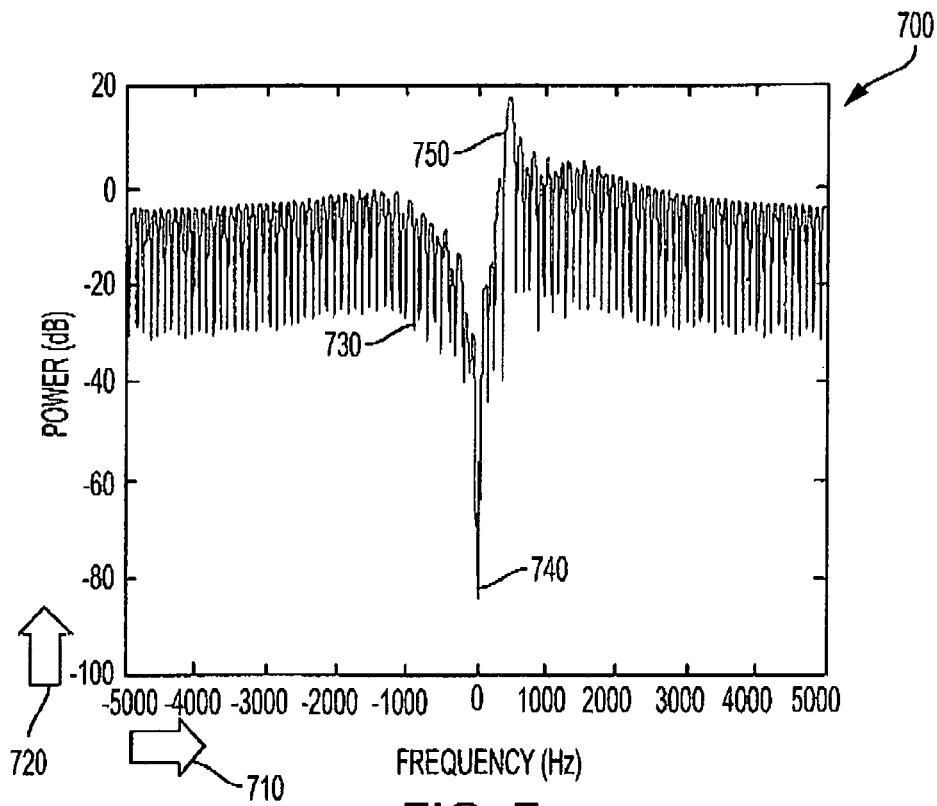
FIG. 7 is a graphical view of an optimum filter frequency response plot.

FIG. 7 shows graphical view of an optimum filter frequency response plot 700. The optimum filter maximizes the signal-to-interference ratio (SIR) for a target of known Doppler response where the interference is the sum of the receiver noise and the clutter signal. The abscissa denotes frequency 710 in Hertz, and the ordinate denotes power 720 in decibels. A response curve 730 shows a minimum peak 740 of about −85 dB at a frequency near 0 Hz corresponding to the maximum clutter Doppler spectrum 440 in view 400. The maximum response 760 corresponds to the target maximum Doppler response 640 in view 600.

Figure 8:
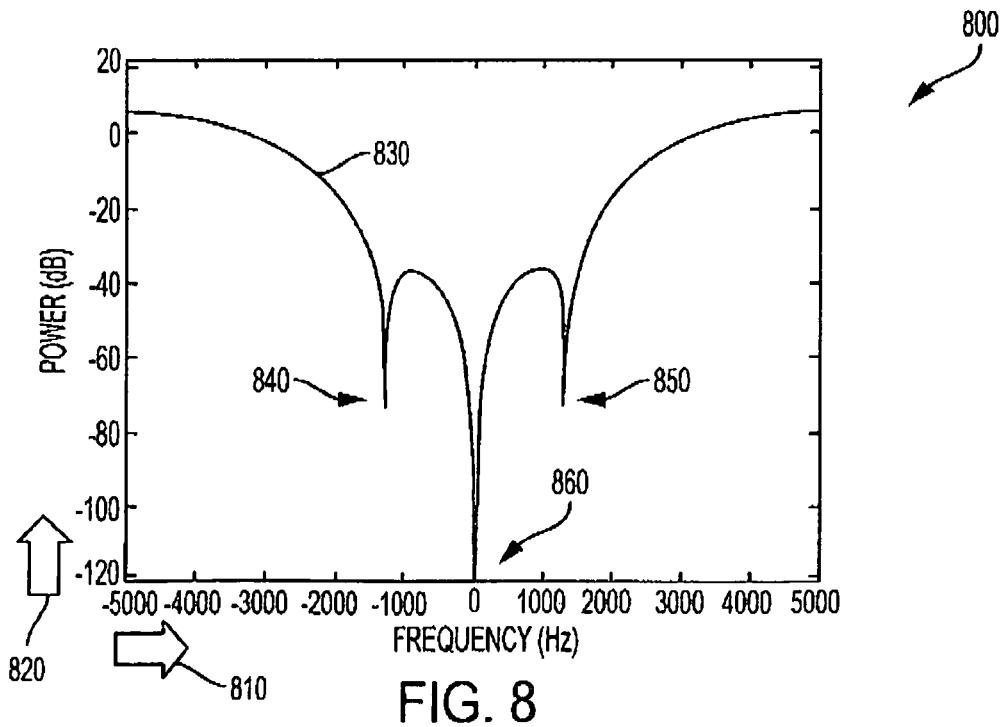
FIG. 8 is a graphical view of an optimum MTI frequency plot.

FIG. 8 shows graphical view of an optimum moving target indicator (MTI) filter frequency response plot 800. The optimum MTI filter seeks to maximize the SIR for targets of unknown Doppler. The abscissa denotes frequency 810 in Hertz, and the ordinate denotes power 820 in decibels. The response curve 830 shows Doppler rejection region 840 with amplitude reduction over maximum filter response of at least 40 dB, and maximum rejection 850 (corresponding to maximum clutter response 440 of over 120 dB.

Figure 9:
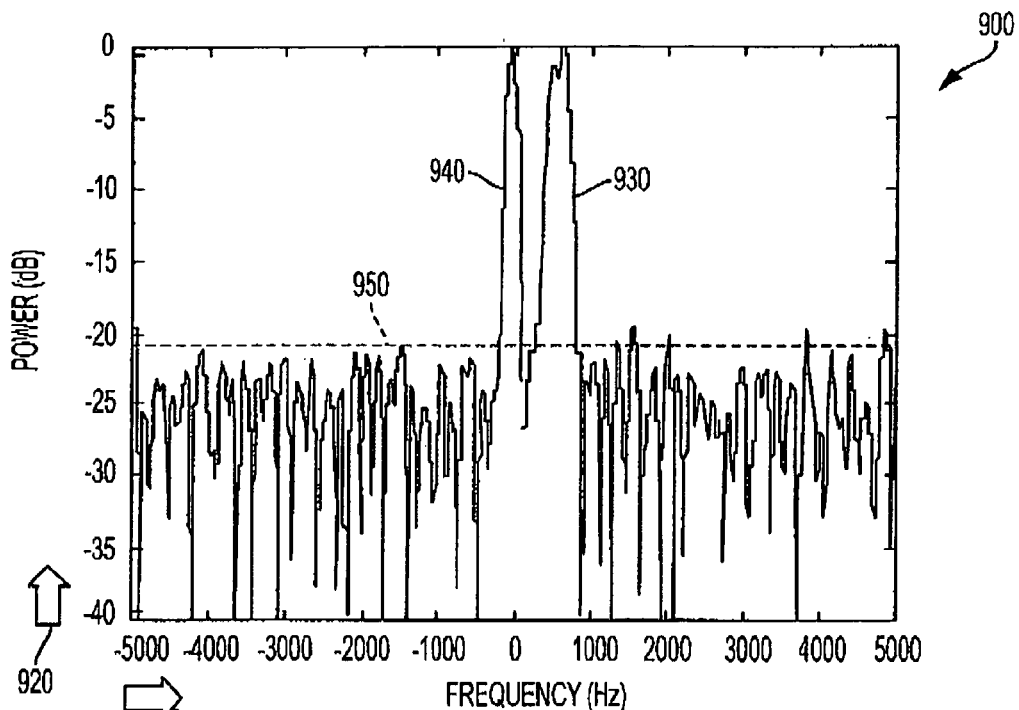
FIG. 9 is a graphical view of a frequency weather spectrum plot with clutter.

FIG. 9 shows a graphical view of a frequency weather spectrum plot 900 with clutter. The abscissa denotes frequency 910 in Hertz, and the ordinate denotes power 920 in decibels. The response represents a desired weather target signal 930. Spikes include a confounding clutter signal 940 and an average noise response 950 of 21 dB less than the desired signal 930. Note separate peaks for clutter 940 at 0

Hz and weather target 930 at 60 Hz, and that clutter 940 and target 930 have similar values at 0 dB.

Figure 10:
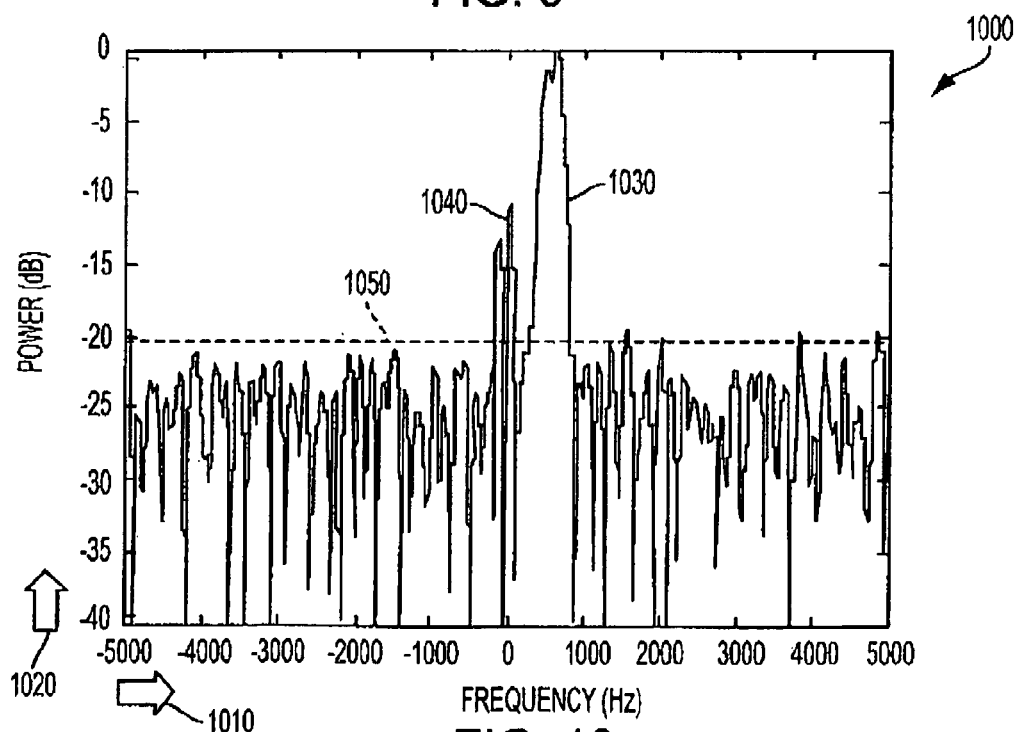
FIG. 10 is a graphical view of a frequency weather spectrum plot sans clutter.

FIG. 10 shows a graphical view of a frequency weather spectrum plot 1000 using exemplary embodiments to mitigate the clutter. The abscissa denotes frequency 1010 in Hertz, and the ordinate denotes power 1020 in decibels. The first response 1030 has an unaltered weather signal while the second response 1040 shows the clutter signal significantly diminished at about −12 dB, with average noise power unchanged; the noise threshold 1050 being at −21 dB. One can observe a reduction of about 10 dB of the clutter 1040 from the unfiltered clutter 940 that clearly distinguishes over peaks for the weather targets 930 and 1030.

Various exemplary embodiments provide improvements in the ability of radars to detect slow moving targets in the presence of clutter. An additional objective of the exemplary embodiments to improve the ability of weather radars to detect and measure weather phenomena by mitigating the negative effects of ground clutter. This disclosure describes a process to maximize the signal to interference ratio for slow-moving targets by applying the characteristics of the radar's two-way antenna pattern gain 240 and the clutter-to-noise ratio (CNR). The antenna pattern can be measured during manufacture of the antenna.

The CNR can be measured from the radar or predicted using a clutter model such as the Littoral Clutter Model, as provided by George LeFurjah et al., "A Robust Integrated Propagation and Site Specific Land Clutter Model", *IEEE Radar Conference*, (2007) 1-4244-0283-2. In addition, exemplary embodiments present a process to estimate with high accuracy the ground clutter correlation matrix/spectrum applying the knowledge of the radar's two way antenna pattern and CNR.

Exemplary embodiments reveal the radar antenna as having a two-way voltage pattern sufficient to design an optimum filter, thereby maximizing the probability of detection of targets in the presence of clutter, and additionally for maximizing the weather signal and improving the estimates of weather moments. Hence, features of this exemplary technique include:

(a) Determine the clutter correlation matrix from the two antenna voltage pattern;
(b) Determine the target correlation matrix from the two-way antenna voltage pattern;
(c) Determine the clutter-to-noise ratio (CNR) γ by direct measurement from the radar or from a suitable clutter model if required;
(d) Using information from (a) and (b) to develop an eigen-filter for application to the radar signal processor (ahead of the detector) for improved target detection; and
(e) Using information from (a) and (c) to apply clutter correlation properties to the MTI filter or other more sophisticated clutter mitigation schemes for improved weather moment estimation.

Optimum Filters:

Artisans of ordinary skill recognize that antenna motion induces a Doppler spread on the clutter spectrum. By determining the clutter spectrum the optimum filter, i.e., the filter that maximizes signal-to-interference ratio (SIR) can be determined. This description shows that the clutter spectrum can be calculated à priori (via the correlation matrix) subject to reasonable assumptions, including that all the Doppler spread is induced by the antenna motion alone.

While clutter sources such as trees and other objects at fixed locations can have internal motion, the largest scatterers tend to be buildings, towers and mountains. These scatters primarily produce very large direct current (DC) clutter with negligible nonzero Doppler relative to background. Because the largest clutter amplitudes most adversely affect target detection, one may assume that the nonzero Doppler spectrum of scatterers can be ignored.

Conventionally, clutter is generally modeled as either distributed or discrete background noise. Distributed clutter is continuous over range and angle, and can have random values while appearing continuously. By contrast, discrete clutter only occurs at specific ranges and angles. Discrete clutter can occur at any range or angle, and can develop at any range or angle with random amplitude. In this derivation, the disclosure explains that the optimum filter is the same for distributed and discrete clutter.

Clutter Correlation Derivation:

Artisans of ordinary skill will recognize that antenna motion induces a Doppler spread on the clutter spectrum. By determining a more accurate clutter spectrum existing and future clutter mitigation schemes can significantly improve their performance. Thus, the clutter spectrum can be calculated à priori (via a correlation matrix) subject to some reasonable assumptions. The first assumption imposes all the Doppler spread being induced by the antenna motion alone, thereby ignoring smaller clutter sources, such as from trees in favor of larger clutter sources, such as buildings, bridges, towers and mountains. These scatters primarily produce very large DC clutter with negligible nonzero Doppler. Because the largest clutter amplitudes affect target detection the most, the nonzero Doppler spectrum of scatterers can be ignored. This disclosure demonstrates the important result that the spectrum correlation is identical for distributed and discrete clutter.

Continuous Clutter:

Continuous or distributed clutter appears at all angles with random amplitudes and is not resolvable in angle. Thus, transient output clutter voltage C(t) observed at slow time t (i.e., for Doppler processing instead of pulse compression) at the output of the antenna is computed as:

$$C(t) = \int c_t(\theta) g(\theta - \theta_p) d\theta, \quad (1)$$

where $c_t(\theta)$ is the clutter voltage value at azimuth θ at slow time t, g is an angularly varying two-way voltage antenna pattern and $\theta_p$ is the pointing angle 180 of the beam at the start of the CPI. FIG. 11 shows a tabular listing 1100 as a Table for the definitions of variables and symbols. The integration is conducted over the entire antenna pattern, which represents the zero elevation cut and may or may not be aligned with antenna boresight. Using the zero elevation cut is important as the beam rises because the ground clutter enters the radar as side-lobe effects.

The integral in eqn. (1) sums up the back-scatter from all the scatters modulated by the antenna gain (described as pattern g) as a function of angle. The output clutter voltage at some later time t+τ is given as:

$$c(t+\tau) = c_{t+\tau}(\theta) g(\theta - \theta_p - \tau \dot{\theta}) d\theta, \quad (2)$$

where $\dot{\theta}$ is the antenna rotation rate, that also corresponds to the angular speed ω 160. This angular motion of the antenna is introduced through the antenna rotation rate correspondingly changes the antenna gain as a function of time.

The antenna linear motion enters with clutter voltage value as follows:

$$c_{t+\tau}(\theta) = c_t(\theta) \exp[j\tau \dot{\varphi}(\theta - \theta_B - \tau \dot{\theta})], \quad (3)$$

where $\dot{\varphi}(\theta)$ is the phase change rate and accounts for the linear motion of the antenna in directions that are off-boresight in view 100, j=√−1, τ is the time offset and $\theta_B$ is the boresight angle of the antenna. Note that time-phase ramp due to induced Doppler from linear angular motion is computed as:

$$\varphi(\theta - \theta_B) = \frac{2v_\theta(\theta - \theta_B)2\pi}{\lambda} = \frac{4\pi r \omega(\theta - \theta_B)}{\lambda}, \quad (4)$$

and azimuth velocity for radial distance r can be expressed as:

$$v_\theta = \omega r \sin(\theta - \theta_B). \quad (5)$$

The clutter correlation function 330 of output clutter voltage C(t) can be written as:

$$R_c(\tau) = E\{C(t)C^*(t+\tau)\}, \quad (6)$$

where E represents expectation operator and C* denotes the complex conjugate of clutter voltage C. Next, using eqns. (1), (2) and (3), eqn. (6) can be rewritten as:

$$R_c(\tau) = E\{\iint c_t(\alpha)c_t(\beta)g(\alpha-\theta_p)\exp[-j\tau\dot\varphi(\beta-\theta_B-\tau\dot\theta)]g^*(\beta-\theta_B-\tau\dot\theta)d\alpha d\beta\}, \quad (7)$$

where $\alpha$ and $\beta$ are variables of integration, $c_t^*$ is the complex conjugate of clutter voltage value $c_t$ and $g^*$ is the complex conjugate of pattern g.

Next, two assumptions about clutter value $c_t(\theta)$ are invoked. First, is that the expectation of clutter voltage is zero mean:

$$E\{c_t(\theta)\}=0, \quad (8)$$

and secondly, that the clutter voltage value $c_t$ is independent or uncorrelated over angle has unity power to produce:

$$E\{c_t(\alpha)c_t^*(\beta)\} = \begin{cases} 1, & \alpha = \beta \\ 0, & \alpha \neq \beta \end{cases}, \quad (9)$$

such that the cross correlation in angle of the clutter voltage is zero.

Applying eqns. (8) and (9) to eqn. (7) yields:

$$R_c(\tau) = \int g(\theta-\theta_p)g^*(\theta-\theta_p-\tau\dot\theta)\exp[-j\tau\dot\varphi(\theta-\theta_B-\tau\dot\theta)]d\theta. \quad (10)$$

This represents an important result showing ability to compute an accurate estimate of the clutter correlation function 330 based solely on knowledge of the antenna characteristics using eqn. (10). Moreover, eqn. (10) is independent of the clutter's distribution and only requires that the clutter has a zero mean and is independent for different azimuths. The distributions need not be the same for different azimuths.

Because the clutter Doppler spectrum can be obtained by the Fourier transform of the time correlation function, eqn. (10) can be used to determine the Doppler spectrum of the clutter (as shown in graph 400). To determine optimum filter, one should establish an M×M correlation matrix $R_c$ of the clutter, where M is the number of pulses in the CPI. This correlation matrix includes elements calculated from eqn. (10) by:

$$R_c(i,k) = R_c[(i-k)T_s], \quad (11)$$

where i is the row index, k is the column number and $T_s$ is the time between pulses known as the pulse repetition interval (PRI).

Discrete Clutter:

Discrete clutter is produced by a single scatter whose azimuth and amplitude are random. Under this clutter model, the clutter voltage observed at slow time t at the output voltage of the antenna is computed as:

$$C(t) = c_t g(\theta-\theta_p), \quad (12)$$

where azimuth angle $\theta$ is now a random variable. The clutter at later time offset $\tau$ is calculated as:

$$C(t+\tau) = c_t g(\theta-\theta_p-\tau\dot\theta)\exp[j\tau\dot\varphi(\theta-\theta_B-\tau\dot\theta)]. \quad (13)$$

The correlation function of the discrete clutter from eqn. (6) can be expanded to:

$$R_c(\tau) = E\{|c_t|^2 g(\theta-\theta_p)g^*(\theta-\theta_p-\tau\dot\theta)\exp[-j\tau\varphi(\theta-\theta_B-\tau\dot\theta)]\}. \quad (14)$$

One can assume that the clutter voltage value $c_t$ is zero mean having variance as unity. The random azimuth angle $\theta$ is assumed to be uniformly distributed. Further, one can assume that the clutter voltage value $c_t$ and azimuth angle $\theta$ are statistically independent. These assumptions obtain:

$$R_c(\tau) = \frac{1}{2\Delta\theta}\int_{-\Delta\theta}^{\Delta\theta} g(\theta-\theta_p)g^*(\theta-\theta_p-\tau\dot\theta)\exp[-j\tau\varphi(\theta-\theta_B-\tau\dot\theta)]d\theta, \quad (15)$$

where $\pm\Delta\theta$ are the limits of the antenna pattern angle. Because the scaling factor of $1/(2\Delta\theta)$ (or written $\frac{1}{2}(\Delta\theta)^{-1}$) can be ignored, eqn. (15) reduces as equivalent to eqn. (10). Thus, the clutter correlation function and the optimum filter are identical for distributed and point clutter. Because real world clutter is neither purely distributed or point clutter the filter derived herein remains the optimum filter (subject to the previous assumptions).

Discrete Clutter at a Known Angle:

For the case that the location of the interfering point clutter is known, a better filter can be developed. In this case the clutter is at angle $\theta_c$. This improves the filter because the uncertainty of the discrete clutter location has been removed. For this case, eqn. (12) becomes:

$$C(t) = c_t g(\theta_c-\theta_p), \quad (16)$$

and similarly the clutter at the output of the antenna at clutter at a later time t+τ is calculated as:

$$C(t+\tau) = c_t g(\theta_c-\theta_p-\tau\dot\theta)\exp[j\tau\dot\varphi(\theta_c-\theta_B-\tau\dot\theta)]. \quad (17)$$

Based on this, the correlation function of the discrete clutter can be written as:

$$R'_c(\tau) = E\{C(t)C^*(t+\tau)\} = g(\theta_c-\theta_p)g^*(\theta_c-\theta_p-\tau\dot\theta)\exp[-j\tau\varphi(\theta_c-\theta_B-\tau\dot\theta)], \quad (18)$$

where $C^*(t+\tau)$ is the complex conjugate of the antenna clutter at the later time. Note that the correlation function differs from eqn. (9), although this is a function of the antenna pattern.

Target Correlation:

Next a similar correlation matrix $M_s$ of the target must be determined. If the beam motion is ignored the signal correlation matrix is determined as:

$$M_s = ss^H, \quad (19)$$

where signal vector $s = [1 \ \exp(j\omega_d T_s) \ \ldots \ \exp(j\omega_d(M-1))]^T$ (transpose of a column matrix). H is the Hermitian conjugate transpose and $\omega_d$ is the target's angular Doppler frequency. A more accurate manner to calculate signal correlation matrix takes into account the motion of the antenna. To accomplish this, one can define angle $\theta$ as the azimuth of a radial inbound target.

Because the position of the target within the beam is unknown, this can be treated as a random variable and used to calculate the signal correlation matrix. To begin with, the signal s is modeled in continuous time as:

$$s(t) = \exp[j(\omega_d t+\varphi)]g(\theta-\theta_p)\exp[j\tau\dot\varphi(\theta-\theta_B)], \quad (20)$$

where $\omega_d$ is the target Doppler angular frequency, $\varphi$ is the random phase of the target, and $\theta$ is the azimuth angle of the target denoting a random variable. The amplitude of the target is a scaling factor that can be ignored. The target signal s at some time offset $\tau$ later is:

$$s(t+\tau)=\exp[-j(\omega_d(t+\tau)+\varphi)]g(\theta-\theta_p-\tau\dot\theta)\exp[-j\tau\dot\varphi(\theta-\theta_B-\tau\dot\theta)]. \quad (21)$$

The correlation function of the signal is determined as:

$$R_s(\tau)=E\{s(t)s^*(t+\tau)\}, \quad (22)$$

where s* is the complex conjugate of the target signal s.

The targets are assumed to be uniformly distributed in the beam. Therefore, angle $\theta$ is a uniformly distributed random variable. One can also note that targets outside the beam are blanked by the side-lobe blanker (SLB), the signal correlation 520 can be determined as:

$$R_s(\tau) = \frac{\exp[-j(\omega_d\tau)]}{2\theta_{SLB}} \int_{\theta_p-\theta_{SLB}}^{\theta_p+\theta_{SLB}} \exp[-j\tau\dot\varphi(\theta-\theta_B-\tau\dot\theta)]g(\theta-\theta_p)g^*(\theta-\theta_p-\tau\dot\theta)d\theta, \quad (23)$$

where $\theta_{SLB}$ is the angular limit of the SLB function. Note that eqn. (23) is similar to eqn. (10), and absent any side-lobe blanker limit on target detection, this becomes exactly eqn. (10) modified by the target Doppler frequency factor $\exp[-j(\omega_d\tau)]$. U.S. Pat. No. 4,959,653 provides an adaptive side-lobe blanker for an antenna. The signal correlation matrix is determined from the correlation function similar to eqn. (20) as:

$$M_s(i,k) = \frac{\exp[-j(i-k)T_s]}{2\theta_{SLB}} R_c[(i-k)T_s]. \quad (24)$$

The target time correlation determined by eqn. (23) is shown in graph 500. Correspondingly, the target spectrum computed by eqn. (23) by the Fourier transform is shown in graph 600. Without using the antenna patterns, a completely accurate target correlation function would not be possible to determine.

Complete Interference Correlation:

In order to form a filter or otherwise mitigate the effect of clutter, a measure of the clutter amplitude as compared to the receiver noise is needed. In order to accomplish that objective, one may perform a direct measurement from the radar to determine the clutter-to-noise ratio $\gamma$. Alternatively, one may use clutter models such as LeFurjah's Littoral Clutter Model. Doing this enables the noise correlation matrix to be determined as:

$$R_n = \frac{1}{\gamma}I, \quad (25)$$

where I is the M×M identity matrix and $\gamma$ is the clutter-to-noise ratio (CNR). Using the clutter-to-noise ratio $\gamma$ then enables the complete interference correlation matrix to be calculated as:

$$R_I = R_c + \frac{1}{\gamma}I, \quad (26)$$

where $R_c$ is determined from eqn. (11).

Optimum Filter for Known Target:

Schleher provides coefficients for the filter (D. Curtis Schleher, *MTI and Pulsed Doppler Radar*, 2010, pp. 283-284, Boston, Mass., Artech House) whose coefficients are equal to the eigenvector element values for the eigenvector associated with the largest eigenvalue for the combined matrix:

$$(R_c+R_n)^{-1}M_s=0. \quad (27)$$

Note that Schleher's interference correlation matrix $R_n$ in his eq. (5.12) is denoted as $R_c$ in eqn. (26). Optimum in this context means that the eigen-filter produces the highest signal-to-interference ratio output of all possible filters.

The graph 700 shows the frequency response of the optimum filter for the clutter spectrum in graph 400 and the target spectrum in graph 600. The exemplary filter is possible due to the ability to determine the clutter correlation matrix $R_c$, the target correlation matrix $R_s$ and the clutter-to-noise ratio $\gamma$ as described above. The exemplary filter significantly improves the detection of targets that have Doppler frequencies close to the clutter Doppler spectrum.

Schleher (pp. 295-302) derives the optimum filter that maximizes the signal-to-interference ratio for the condition that the target Doppler speed is unknown. To apply this discovery to the exemplary filter one can observe that clutter correlation matrix $R_c$ in eqn. (11) is the same as $R_c$ in Schleher's eq. (5.68). Note also that noise correlation matrix $R_n$ in eqn. (25) is the same as $R_n$ in Schleher's eq. (5.68). Applying, eqn. (11) to the Optimized MTI Processor enables one to design a more accurate and better performing filter than possible with previous approach. Note that eqn. (11) for the clutter correlation matrix employs either eqn. (10) or eqn. (18) as applicable.

Weather radar processing can be improved in other manners using exemplary embodiments. The plot 900 shows the Doppler spectrum of weather radar signals including clutter 940, weather 930 and noise 950. Using eqn. (10) or eqn. (18), one can calculate the clutter spectrum using the Fourier transform, as shown in plot 400. Combining this with a direct measurement of the clutter amplitude or estimating from a clutter model enables one to calculate the clutter spectrum in reference to the noise level, and thereby subtract this from the Doppler spectrum, as illustrated in plot 1000. Here, the clutter spectrum 1040 illustrates the clutter residue that is significantly attenuated by the exemplary technique while the weather spectrum 1030 and noise floor 1050 are not affected. Therefore, the exemplary techniques improve the ability of the radar to estimate weather phenomena.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented filtering method for attenuating clutter in a radar signal from a target to a radar system, said signal being received by an antenna coupled to said radar system, said method comprising:

determining properties of a clutter correlation function $R_c$ of the antenna for continuous clutter of an unknown azimuth angle $\theta$ at a time interval $\tau$ by a continuous relation:

$$R_c(\tau)=\int g(\theta-\theta_p)g^*(\theta-\theta_p-\tau\dot\theta)\exp[-j\tau\dot\varphi(\theta-\theta_B-\tau\dot\theta)]d\theta,$$

where $\theta_p$ is a pointing angle of a beam from the antenna, $\theta_B$ is a boresight angle of the antenna, $\dot\theta$ is an antenna rotation rate, g is an angularly varying 4-way voltage antenna pattern gain, and $\dot\varphi$ is a phase change rate and accounts for a linear motion of the antenna in off-boresight directions, $j \equiv \sqrt{-1}$ is the imaginary number, and g* is the complex conjugate of said pattern gain g;

estimating said clutter-to-noise ratio for a signal correlation matrix:

$$M_s(i,k) = \frac{\exp[-j(i-k)T_s]}{2\theta_{SLB}} R_c[(i-k)T_s],$$

where i is the row index, k is the column number, azimuth angle $\theta_{SLB}$ is a side-lobe blanker azimuth angle limit, and $T_s$ is a pulse repetition interval;

optimizing said clutter-to-noise ratio by a combination matrix:

$$(R_c + R_n)^{-1} M_s = 0,$$

where $$R_s = \frac{1}{\gamma} I$$

is a noise correlation matrix with I as an identity matrix and $\gamma$ is a clutter-to-noise ratio; and obtaining a filter signal for the radar system from said combination matrix with which to detect and measure the target.

2. A computer-implemented filtering method for attenuating clutter in a radar signal from a target to a radar system, said signal being received by an antenna coupled to said radar system, said method comprising:

determining properties of a clutter correlation function $R'_c$ of the antenna for discrete clutter of a known azimuth angle $\theta_c$ by a relation:

$$R'_c(\tau) = g(\theta_c - \theta_p) g^*(\theta_c - \theta_p - \tau\dot\theta) \exp[j\tau\dot\varphi(\theta_c - \theta_B - \tau\dot\theta)],$$

where $\theta_p$ is a pointing angle of a beam from the antenna, $\theta_B$ is a boresight angle of the antenna, $\dot\theta$ is an antenna rotation rate, g is an angularly varying two-way voltage antenna pattern gain, $\tau$ is a time offset, and $\dot\varphi$ is a phase change rate and accounts for a linear motion of the antenna in off-boresight directions, $j \equiv \sqrt{-1}$ is the imaginary number, and g* is the complex conjugate of said pattern gain g;

estimating said clutter-to-noise ratio for a signal correlation matrix:

$$M_s(i,k) = \frac{\exp[-j(i-k)T_s]}{2\theta_{SLB}} R_c[(i-k)T_s],$$

where i is the row index, k is the column number, and azimuth angle $\theta_{SLB}$ is a side-lobe blanker azimuth angle limit, and $T_s$ is a pulse repetition interval;

optimizing said clutter-to-noise ratio by a combination matrix:

$$(R_c + R_n)^{-1} M_s = 0,$$

where $$R_s = \frac{1}{\gamma} I$$

is a noise correlation matrix with I as an identity matrix and $\gamma$ is a clutter-to-noise ratio; and obtaining a filter signal for the radar system from said combination matrix with which to detect and measure the target.

3. A computing device that executes a filtering process to attenuate clutter in a radar signal from a target to an antenna coupled to a radar system, said device comprising:

a clutter correlation processor for determining properties of a clutter correlation function $R_c$ of the antenna for continuous clutter of an unknown azimuth angle $\theta$ at a time interval $\tau$ by a continuous relation:

$$R_c(\tau) = \int g(\theta - \theta_p) g^*(\theta - \theta_p - \tau\dot\theta) \exp[-j\tau\dot\varphi(\theta - \theta_B - \tau\dot\theta)] d\theta,$$

where $\theta_p$ is a pointing angle of a beam from the antenna, $\theta_B$ is a boresight angle of the antenna, $\dot\theta$ is an antenna rotation rate, g is an angularly varying two-way voltage antenna pattern gain, and $\dot\varphi$ is a phase change rate and accounts for a linear motion of the antenna in off-boresight directions, $j \equiv \sqrt{-1}$ is the imaginary number, and g* is the complex conjugate of said pattern gain g;

a ratio estimation processor for estimating said clutter-to-noise ratio for a signal correlation matrix:

$$M_s(i,k) = \frac{\exp[-j(i-k)T_s]}{2\theta_{SLB}} R_c[(i-k)T_s],$$

where i is the row index, k is the column number, azimuth angle $\theta_{SLB}$ is a side-lobe blanker azimuth angle limit, and $T_s$ is a pulse repetition interval;

a combinatorial processor for said clutter-to-noise ratio by a combination matrix:

$$(R_c + R_n)^{-1} M_s = 0,$$

where $$R_s = \frac{1}{\gamma} I$$

is a noise correlation matrix with I as an identity matrix and $\gamma$ is a clutter-to-noise ratio; and a signal processor for providing a filter signal for the radar system from said combination matrix with which to detect and measure the target.

* * * * *